US010711120B2

(12) United States Patent
Isitman et al.

(10) Patent No.: US 10,711,120 B2
(45) Date of Patent: Jul. 14, 2020

(54) RUBBER COMPOSITION AND PNEUMATIC TIRE

(71) Applicant: The Goodyear Tire & Rubber Company, Akron, OH (US)

(72) Inventors: Nihat Ali Isitman, Hudson, OH (US); Paul Harry Sandstrom, Cuyahoga Falls, OH (US); Caude Charles Jacoby, Wasserbillig (LU)

(*) Notice: Subject to any disclaimer, the term of this patent is extended or adjusted under 35 U.S.C. 154(b) by 48 days.

(21) Appl. No.: 15/964,425

(22) Filed: Apr. 27, 2018

(65) Prior Publication Data
US 2019/0330452 A1  Oct. 31, 2019

(51) Int. Cl.
C08L 9/00 (2006.01)
B60C 1/00 (2006.01)
C08K 3/04 (2006.01)
C08L 25/06 (2006.01)
C08K 3/32 (2006.01)
C08L 93/00 (2006.01)

(52) U.S. Cl.
CPC .............. C08L 9/00 (2013.01); B60C 1/0016 (2013.01); C08K 3/04 (2013.01); C08K 3/32 (2013.01); C08L 25/06 (2013.01); C08L 93/00 (2013.01)

(58) Field of Classification Search
CPC ........... C08L 2205/025; C08L 2205/03; C08L 2205/035; C08L 9/00
See application file for complete search history.

(56) References Cited

U.S. PATENT DOCUMENTS

| | | |
|---|---|---|
| 5,395,891 A | 3/1995 | Obrecht |
| 5,504,135 A | 4/1996 | Ardrizzi |
| 5,672,639 A | 9/1997 | Corvasce |
| 6,103,808 A | 8/2000 | Hashimoto |
| 6,127,488 A | 10/2000 | Obrecht |
| 6,133,364 A | 10/2000 | Obrecht |
| 6,146,520 A | 11/2000 | Gupte |
| 6,207,757 B1 | 3/2001 | Obrecht |
| 6,242,534 B1 | 6/2001 | Obrecht |
| 6,248,929 B1 | 6/2001 | Kaimai |
| 6,372,857 B1 | 4/2002 | Obrecht |
| 6,399,697 B1 | 6/2002 | Takasaki |
| 6,410,816 B2 | 6/2002 | Takasaki |
| 6,608,125 B2 | 8/2003 | Cruse |
| 2001/0007049 A1 | 7/2001 | Taksaki |
| 2001/0023307 A1 | 9/2001 | Kaimai |
| 2002/0000280 A1 | 1/2002 | Scholl |
| 2002/0045697 A1 | 4/2002 | Sohnen |
| 2003/0130535 A1 | 7/2003 | Deschler |
| 2006/0041063 A1 | 2/2006 | Cruse |
| 2009/0105398 A1 | 4/2009 | Hirabayashi |
| 2009/0105403 A1 | 4/2009 | Hirabayashi |
| 2010/0179247 A1* | 7/2010 | Vest ............... B60C 1/0016 523/150 |
| 2013/0059965 A1 | 3/2013 | Hirose |
| 2013/0231417 A1* | 9/2013 | Vasseur ............... B60C 1/00 523/156 |
| 2014/0364536 A1 | 12/2014 | Kawai |
| 2016/0168364 A1 | 6/2016 | Nakamura |

FOREIGN PATENT DOCUMENTS

| | | |
|---|---|---|
| EP | 0839891 B1 | 6/2004 |
| ES | 2122917 A | 12/1998 |
| JP | 2002097369 A | 4/2002 |

OTHER PUBLICATIONS

European Search Report for Serial No. 19170475.8 dated Sep. 23, 2019.

* cited by examiner

Primary Examiner — Jeffrey C Mullis

(57) ABSTRACT

The present invention is directed to a vulcanizable rubber composition comprising (A) 100 parts by weight of elastomer consisting of 70 to 100 parts by weight, er 100 parts by weight of the elastomer (phr), of an isoprene-butadiene rubber having a Tg ranging from −100° C. to −50° C., and 0 to 30 phr of a second elastomer selected from the group consisting of isoprene-butadiene rubber having a Tg ranging from −49 to −20° C., natural rubber, synthetic polyisoprene, and polybutadiene, (B) from 30 to 80 phr of a resin having a Tg of at least 20 C, (C) from 0 to 4 phr of an oil, and (D) from 80 to 180 of a filler selected from the group consisting of carbon black and silica.

15 Claims, No Drawings

RUBBER COMPOSITION AND PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads.

Tire treads are sometimes desired to demonstrate excellent grip properties on snowy and icy roads especially at low ambient temperatures. Simultaneously, the tread is required to have low hysteresis at high temperature to promote lower rolling resistance and high hysteresis at low temperature to promote traction on wet roads. To achieve a low stiffness at low temperatures, low hysteresis at high temperature and high hysteresis at low temperature, it is preferable for the tread compounds of snow/ice tires to utilize a blend of low Tg elastomers.

SUMMARY OF THE INVENTION

The present invention then is directed to a vulcanizable rubber composition comprising
(A) 100 parts by weight of elastomer consisting of 70 to 100 parts by weight, per 100 parts by weight of the elastomer (phr), of an isoprene-butadiene rubber having a Tg ranging from −100° C. to −50° C., and 0 to 30 phr of a second elastomer selected from the group consisting of isoprene-butadiene rubber having a Tg ranging from −49 to −20° C., natural rubber, synthetic polyisoprene, and polybutadiene;
(B) from 30 to 80 phr of a resin having a Tg of at least 20 C;
(C) from 0 to 4 phr of an oil; and
(D) from 80 to 180 of a filler selected from the group consisting of carbon black and silica.

The invention is further directed to a pneumatic tire having a component comprising the rubber composition, and a method of making the rubber composition.

DESCRIPTION OF THE INVENTION

There is disclosed to a vulcanizable rubber composition comprising
(A) 100 parts by weight of elastomer consisting of 70 to 100 parts by weight, per 100 parts by weight of the elastomer (phr), of an isoprene-butadiene rubber having a Tg ranging from −100° C. to −50° C., and 0 to 30 phr of a second elastomer selected from the group consisting of isoprene-butadiene rubber having a Tg ranging from −49 to −20° C., natural rubber, synthetic polyisoprene, and polybutadiene;
(B) from 30 to 80 phr of a resin having a Tg of at least 20 C;
(C) from 0 to 4 phr of an oil; and
(D) from 80 to 180 of a filler selected from the group consisting of carbon black and silica.

The invention is further directed to a pneumatic tire having a component comprising the rubber composition, and a method of making the rubber composition.

The vulcanizable rubber composition includes from 70 to 100 phr of an isoprene-butadiene rubber (IBR) having a Tg ranging from −100° C. to −50° C.

The IBR used in the tire tread rubber blends of this invention can be synthesized by solution polymerization. Such solution polymerization will normally be carried out in a hydrocarbon solvent which can be one or more aromatic, paraffinic or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene and the like, alone or in admixture.

In the solution polymerizations employed in synthesizing, the IBR there will normally be from about 5 to about 35 weight percent monomers in the polymerization medium. Such polymerization media are, of course, comprised of the organic solvent, 1,3-butadiene monomer and isoprene monomer. In most cases, it will be preferred for the polymerization medium to contain from 10 to 30 weight percent monomers. It is generally more preferred for the polymerization medium to contain 20 to 25 weight percent monomer.

The monomer charge compositions utilized in the synthesis of the IBR used in the tire tread rubber compounds of this invention will typically contain from about 20 weight percent to about 50 weight percent isoprene and from about 50 weight percent to about 80 weight percent 1,3-butadiene monomer. It is typically preferred for the monomer charge composition to contain from about 25 weight percent to about 35 weight percent isoprene and from about 65 weight percent to about 85 weight percent 1,3-butadiene.

The IBR is typically synthesized on a continuous basis. In such a continuous process, the monomers and an organolithium initiator are continuously fed into a reaction vessel or series of reaction vessels. The pressure in the reaction vessel is typically sufficient to maintain a substantially liquid phase under the conditions of the polymerization reaction. The reaction medium will generally be maintained at a temperature which is within the range of about 70° to about 140° C. throughout the copolymerization. This is generally preferred for the copolymerization to be conducted in a series of reaction vessels and for the reaction temperature to be increased from reaction vessel to reaction vessel as the polymerization proceeds. For instance, it is desirable to utilize a two-reactor system wherein the temperature in the first reactor is maintained within the range of about 70° C. to 90° C. and wherein the temperature in the second reactor is maintained within the range of about 90° C. to about 100° C.

The IBR may be synthesized using conventional organolithium initiators, or may be synthesized using neodymium containing catalyst systems.

The organolithium compounds which can be utilized as initiators are normally organomonolithium compounds. The organolithium compounds which are preferred can be represented by the formula R—Li, wherein R represents a hydrocarbyl radical containing from 1 to about 20 carbon atoms. Generally, such organolithium compounds will contain from 1 to about 10 carbon atoms. Some representative examples of organolithium compounds which can be employed include methyllithium, ethyllithium, isopropyl-lithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium and 4-cyclohexylbutyllithium.

The amount of organolithium initiator employed will be dependent upon the molecular weight which is desired for the IBR being synthesized. An amount of organolithium initiator will be selected to result in the production of IBR having a Mooney ML1+4 viscosity which is within the range of 55 to 140.

As a general rule in all anionic polymerizations, the molecular weight (Mooney viscosity) of the polymer produced is inversely proportional to the amount of catalyst utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

To inhibit gelation, it is important to carry out such polymerizations in the presence of a trace amount of a polar modifier, such as N,N,N',N'-tetramethylethylenediamine (TMEDA). For this reason, it is highly desirable to continuously feed a polar modifier into the reaction vessel utilized. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like. Dipiperidinoethane, dipyrrolidinoethane, tetramethylethylene diamine, diethylene glycol, dimethyl ether, TMEDA and tetrahydrofuran are representative of highly preferred modifiers.

Optionally, 1,2-butadiene can also be continuously fed into the reaction zone. The 1,2-butadiene will typically be present in the polymerization medium at a concentration which is within the range of 10 to about 500 ppm (parts per million parts). It is generally preferred for the 1,2-butadiene to be present at a level which is within the range of about 50 ppm to about 300 ppm. It is generally more preferred for the 1,2-butadiene to be present at a level which is within the range of about 100 ppm to about 200 ppm.

The polar modifier will typically be present at a molar ratio of the polar modifier to the organolithium compound which is within the range of about 0.01:1 to about 0.2:1. A molar ratio of polar modifier to the organolithium initiator of greater than about 0.2:1 should not be exceeded because the polar modifier acts to increase the glass transition temperature of the IBR produced.

The IBR produced is then recovered from the organic solvent. The IBR can be recovered from the organic solvent by standard techniques, such as decantation, filtration, centrification and the like. It is often desirable to precipitate the IBR from the organic solvent by the addition of lower alcohols containing from 1 to about 4 carbon atoms to the polymer solution. Suitable lower alcohols for precipitation of the IBR from the polymer cement include methanol, ethanol, isopropyl alcohol, n-propyl alcohol and t-butyl alcohol. The utilization of lower alcohols to precipitate the IBR from the polymer cement also inactivates lithium end groups. After the IBR is recovered from the organic solvent, steam-stripping can be employed to reduce the level of volatile organic compounds in the rubber.

The solution polymerized IBR has a glass transition temperature in a range from −100° C. to −50° C. A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

Solution polymerized IBR containing functional groups such as alkoxy, amino, alkoxyamino, thioester, hydroxyl, and the like may also be used as the IBR. Such functional groups are useful as being capable of chemically interacting with silica and carbon black fillers, and with polymer unsaturation. Such functionalized IBR may be produced using functional initiators, functional monomers, or functional terminators as is known in the art. Functionalized IBR may include functional groups appended to one or both ends of the IBR, and/or appended along the length of the polymer chain.

The rubber composition may include from 0 to 30 phr of an additional elastomer. Suitable additional elastomers include isoprene-butadiene rubber having a Tg ranging from −49 to −20° C., natural rubber, synthetic polyisoprene, and polybutadiene The rubber composition includes from 0 to 4 phr of a processing oil. In one embodiment, the rubber composition includes from 1 to 4 phr of a processing oil. In one embodiment, the rubber composition includes 0 phr of a processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, and low PCA oils, such as MES, TDAE, and heavy naphthenic oils, vegetable oils such as sunflower, soybean, and safflower oils, and fatty acid monoesters.

In one embodiment, the rubber composition includes a low PCA oil. Suitable low PCA oils include but are not limited to mild extraction solvates (YMS), treated distillate aromatic extracts (TDAE), and heavy naphthenic oils as are known in the art; see for example U.S. Pat. Nos. 5,504,135; 6,103,808; 6,399,697; 6,410,816; 6,248,929; 6,146,520; U.S. Published Applications 2001/0023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. TDAE oils generally have a Tg in a range of from about −44° C. to about −50° C. Heavy naphthenic oils generally have a Tg in a range of from about −42° C. to about −48° C. A suitable measurement for Tg of TDAE oils is DSC according to ASTM E1356, or equivalent.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

Suitable TDAE oils are available as Tudalen SX500 from Klaus Dahleke KG, VivaTec 400 and VivaTec 500 from H&R Group, and Enerthene 1849 from BP, and Extensoil 1996 from Repsol. The oils may be available as the oil alone or along with an elastomer in the form of an extended elastomer.

Suitable vegetable oils include, for example, soybean oil, sunflower oil and canola oil which are in the form of esters containing a certain degree of unsaturation.

Suitable fatty acid monoesters may be selected from the group consisting of alkyl oleates, alkyl stearates, alkyl linoleates, and alkyl palmitates. In one embodiment, the alkyl oleate is selected from the group consisting of methyl oleate, ethyl oleate, 2-ethylhexyl oleate, isopropyl oleate, and octyl oleate.

The rubber composition includes from 30 to 80 phr of a resin having a Tg greater than 20° C. A Tg can be suitably determined as a peak midpoint by a differential scanning calorimeter (DSC) at a temperature rate of increase of 10° C. per minute according to ASTM D6604 or equivalent. The resin has a softening point above 70° C. as determined by ASTM E28 which might sometimes be referred to as a ring and ball softening point. In one embodiment, the rubber composition includes from 30 to 60 phr of resin.

The resin is selected from the group consisting of coumarone-indene resin, petroleum hydrocarbon resin, terpene polymers, styrene-alphamethylstyrene resins, terpene phenol resin, rosin derived resins and copolymers and/or mixtures thereof.

In one embodiment, the resin is a coumarone-indene resin containing coumarone and indene as the monomer components making up the resin skeleton (main chain). Monomer ingredients other than coumarone and indene which may be incorporated into the skeleton are, for example, methyl coumarone, styrene, alphamethylstyrene, methylindene, vinyltoluene, dicyclopentadiene, cycopentadiene, and diolefins such as isoprene and piperlyene.

Suitable petroleum resins include both aromatic and non-aromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species (olefins and diolefines containing an average of five carbon atoms) such as cyclopentadiene, dicyclopentadiene, diolefins such as isoprene and piperylene, and any C9 species (olefins and diolefins containing an average of 9 carbon atoms) such as vinyltoluene, alphamethylstyrene and indene. Such resins are made by any mixture formed from C5 and C9 species mentioned above, and are known as C5/C9 copolymer resins.

In one embodiment, said resin may be a terpene resin comprised of polymers of at least one of limonene, alpha pinene, beta pinene and delta-3-carene.

Terpene-phenol resins may be used. Terpene-phenol resins may be derived by copolymerization of phenolic monomers with terpenes such as limonenes, pinenes and delta-3-carene.

In one embodiment, the resin is a resin derived from rosin and derivatives. Representative thereof are, for example, gum rosin, wood rosin and tall oil rosin. Gum rosin, wood rosin and tall oil rosin have similar compositions, although the amount of components of the rosins may vary. Such resins may be dimerized, polymerized or disproportionated. Such resins may be in the form of esters of rosin acids and polyols such as pentaerythritol or glycol.

In one embodiment, said resin may be partially or fully hydrogenated.

In one embodiment, the rubber composition includes 30 to 80 phr of resin and 0 phr of oil.

In another embodiment, the rubber composition includes 40 to 70 phr of resin and 0 phr of oil.

In another embodiment, the rubber composition includes 45 to 65 phr of resin and 0 phr of oil.

In another embodiment, the rubber composition includes 35 to 75 phr of resin and 1 to 4 phr of oil.

In another embodiment, the rubber composition includes 45 to 65 phr of resin and 1 to 4 phr of oil.

In another embodiment, the rubber composition includes 50 to 60 phr of resin and 1 to 4 phr of oil.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 80 to about 180 phr of a filler selected from carbon black and silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, 315 etc.; silicas available from Rhodia, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N134, N220, N231, N234, N242, N293, N299, 5315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

The vulcanizable rubber composition may include both silica and carbon black in a combined concentration of from about 80 to about 180 phr, the majority of which is preferably silica. In one embodiment, the composition includes from 100 to 160 of silica, and from 1 to 20 phr of carbon black.

Other fillers may be used in the rubber composition including, but not limited to, particulate fillers including ultra-high molecular weight polyethylene (UHMWPE), particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639.

It may be preferred to have the rubber composition for use in the tire component to additionally contain a conventional sulfur containing organosilicon compound. Examples of suitable sulfur containing organosilicon compounds are of the formula:

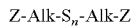

in which Z is selected from the group consisting of

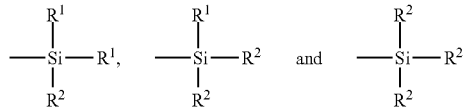

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclohexyloxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide. Therefore, as to formula I, preferably Z is

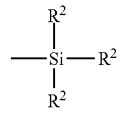

where $R^2$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials.

In another embodiment, suitable sulfur containing organosilicon compounds include compounds disclosed in U.S. Publication 2006/0041063. In one embodiment, the sulfur containing organosilicon compounds include the reaction product of hydrocarbon based diol (e.g., 2-methyl-1,3-propanediol) with S-[3-(triethoxysilyl)propyl] thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 5 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 3, phr. In another embodiment, combinations of a primary and a secondary accelerator might be used with the secondary accelerator being used in smaller amounts, such as from about 0.05 to about 4 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a tread of a tire.

The pneumatic tire of the present invention may be a race tire, passenger tire, aircraft tire, agricultural, earthmover, off-the-road, truck tire, and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Using such mixing procedures, tire building and vulcanization, the invention then further includes a method of making a tire, comprising the step of mixing a vulcanizable rubber composition comprising (A) 100 parts by weight of elastomer consisting of 70 to 100 parts by weight, per 100 parts by weight of the elastomer (phr), of an isoprene-butadiene rubber having a Tg ranging from −100° C. to −50° C., and 0 to 30 phr of a second elastomer selected from the group consisting of isoprene-butadiene rubber having a Tg ranging from −49 to −20° C., natural rubber, synthetic polyisoprene, and polybutadiene;

(B) from 30 to 80 phr of a resin having a Tg of at least 20 C;

(C) from 0 to 4 phr of an oil; and (D) from 80 to 180 of a filler selected from the group consisting of carbon black and silica.

The following examples are presented for the purposes of illustrating and not limiting the present invention. All parts are parts by weight unless specifically identified otherwise.

Example 1

In this example synthesis of IBR is illustrated. IBR was synthesized in a two-reactor (10 liters each) continuous system at 88° C. A premix containing isoprene and 1,3-butadiene in hexane was charged into the first polymerization reactor continuously. The premix monomer solution containing a ratio of isoprene to 1,3-butadiene of 30:70 and had a total monomer concentration of 15 percent. Polymerization was initiated by adding 0.028 phm of n-butyllithium into the first reactor along with 0.0052 phm TMEDA and 200 ppm 1,2 butadiene. The residence time for both reactors was set at 1 hour.

The polymerization medium was continuously pushed over from the second reactor to a holding tank which contained 1.0 phr isopropanol (as a terminator) and 0.5 phr of an antioxidant. The resulting polymer cement was then steam-stripped and the IBR recovered was dried. The polymer was determined to have a glass transition temperature (inflection) at −82.4° C. and have a Mooney ML-4 (100 C) viscosity of 92.6. It was also determined to a number average molecular weight Mn of 227,600, a weight average molecular weight Mw of 374,800 and a polydispersity Mw/Mn of 1.65.

Example 2

This example illustrates the advantage of a rubber composition according to the invention. Rubber compounds were mixed according to the formulations shown in Table 1, with amounts given in phr. The compounds were cured and tested for physical properties as shown in Table 2.

Sample C1 is made by blending a low Tg (−78° C.) solution polymerized SBR with a low Tg (−106° C.) high cis-PBD to obtain a low Tg polymer matrix in order to promote low temperature properties, addition of a high Tg (+47° C.) traction resin and a high loading of reinforcing silica to promote wet traction. However, while obtaining a good balance of low temperature properties measured by G' at −20° C. (25.4 MPa) and wet traction measured by tan D property at 0° C. (0.45) or rebound resilience at 0° C. (14%), such combination of elastomers, traction resin and reinforcing silica in Sample C1 has a relatively high hysteresis at high temperatures measured by rebound resilience at 100° C. (46%).

In order to overcome this, Sample E2 and E3 are made by replacing the SBR and cis-PBD polymers by a low Tg (−82° C.) IBR copolymer. It is discovered that the low temperature stiffness property can be further improved (lowered from 25.4 to 22.7 and 18.8 MPa) while the rebound resilience at 100 C is simultaneously improved (increased from 46 to 49 and 50%), without compromising predicted wet property (maintain tan D at 0° C.).

TABLE 1

| | Sample No. | | |
|---|---|---|---|
| | C1 | E2 | E3 |
| SBR [1] | 50 | 0 | 0 |
| IBR [2] | 0 | 100 | 100 |
| cis-BR [3] | 50 | 0 | 0 |
| Traction resin [4] | 62 | 60 | 56 |
| Oil [5] | 0 | 0 | 4 |
| Rosin acid | 3 | 3 | 3 |
| Waxes | 3 | 3 | 3 |
| Antioxidants | 4 | 4 | 4 |
| Stearic acid | 2 | 2 | 2 |
| Silane [6] | 8.1 | 8.1 | 8.1 |
| Silane [7] | 2 | 2 | 2 |
| Silica [8] | 130 | 130 | 130 |
| ZnO | 2.5 | 2.5 | 2.5 |
| Sulfur | 1.2 | 1.2 | 1.2 |
| Accelerators | 6.2 | 5.6 | 5.7 |

[1] Solution polymerized SBR with styrene content of 18% and 1,2-vinyl content of 10%, Tg = −78° C., obtained from The Goodyear Tire & Rubber Company.
[2] IBR of Example 1, Tg −82.4° C.
[3] High cis polybutadiene, 96 percent cis-1,4, Tg = −108° C. obtained as Budene 1223 from The Goodyear Tire & Rubber Company.
[4] C5/C9 copolymer resin, Tg = 47° C., as Oppera 373 from ExxonMobil.
[5] Sunflower oil, as Agripure AP-65 from Cargill
[6] TESPD type silane coupling agent.
[7] TESPT silane, 50% on carbon black
[8] Hi-Sil 315G-D precipitated silica from PPG with a CTAB surface area of 125 m$^2$/g.

TABLE 2

| | Sample No. | | |
|---|---|---|---|
| | C1 | E1 | E2 |
| Tensile Properties [1] | | | |
| Elongation (%) | 590 | 557 | 575 |
| Modulus 100% (MPa) | 1.6 | 1.7 | 1.7 |
| Modulus 300% (MPa) | 8.5 | 8.1 | 8 |
| Tensile Strength (MPa) | 18.4 | 17.2 | 17.8 |
| RPA instrument [2] | | | |
| TanD (100° C.) | 0.22 | 0.2 | 0.2 |
| Metravib instrument [3] | | | |
| G' (−20° C.) (MPa) | 25.4 | 22.7 | 18.8 |
| TanD (0° C.) | 0.45 | 0.46 | 0.44 |
| Rebound resilience [4] | | | |
| Rebound at 0° C. | 14 | 12 | 13 |
| Rebound at 100° C. | 46 | 49 | 50 |

[1] Data according to Automated Testing System instrument by the Instron Corporation. Such instrument may determine ultimate tensile, ultimate elongation, modulii, etc. Data reported in the Table is generated by running the ring tensile test station which is an Instron 4201 load frame.
[2] Measured at 5% strain, frequency 0.33/3.33 Hz, 60 C. Data according to Rubber Process Analyzer as RPA 2000 .TM. instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, April 26 and May 10, 1993.
[3] The G' modulus and tanD at low temperatures can be readily be determined by a Metravib TM instrument at 1.5 percent strain and 7.8 Hertz. The test method is understood to be similar to ISO 4664 and DIN 53513.
[4] Rebound resilience is a measure of hysteresis of the compound when subject to loading, as measured by ASTM DI054. Generally, the higher the measured rebound at 100° C, the lower the rolling resistance.

While certain representative embodiments and details have been shown for the purpose of illustrating the subject invention, it will be apparent to those skilled in this art that various changes and modifications can be made therein without departing from the scope of the subject invention.

What is claimed is:

1. A vulcanizable rubber composition comprising:
    (A) 100 parts by weight of elastomer consisting of 70 to 100 parts by weight, per 100 parts by weight of the elastomer (phr), of an isoprene-butadiene rubber having a Tg ranging from −100° C. to −50° C., and 0 to 30 phr of a second elastomer selected from the group consisting of isoprene-butadiene rubber having a Tg ranging from −49 to −20° C., natural rubber, synthetic polyisoprene, and polybutadiene;
    (B) from 45 to 65 phr of a resin derived from styrene and alphamethylstyrene and having a Tg of at least 20 C;
    (C) 0 phr of an oil; and
    (D) from 130 to 180 phr of a filler selected from the group consisting of carbon black and silica.

2. The vulcanizable rubber composition of claim 1, wherein the filler comprises from 130 to 160 phr of silica.

3. The vulcanizable rubber composition of claim 1, wherein the second elastomer is an isoprene-butadiene rubber.

4. The vulcanizable rubber composition of claim 1, wherein the oil is selected from the group consisting of aromatic oils, paraffinic oils, naphthenic oils, MES oils, TDAE oils, heavy naphthenic oils, vegetable oils, sunflower oils, soybean oils, and safflower oils.

5. A pneumatic tire having a component comprising the vulcanizable rubber composition of claim 1.

6. A vulcanizable rubber composition comprising:
    (A) 100 parts by weight of elastomer consisting of 70 to 100 parts by weight, per 100 parts by weight of the elastomer (phr), of an isoprene-butadiene rubber having a Tg ranging from −100° C. to −50° C., and 0 to 30 phr of a second elastomer selected from the group consisting of isoprene-butadiene rubber having a Tg ranging from −49 to −20° C., natural rubber, synthetic polyisoprene, and polybutadiene;

(B) from 45 to 65 phr of a resin derived from styrene and alphamethylstyrene and having a Tg of at least 20° C.;
(C) from 1 to 4 phr of an oil; and
(D) from 130 to 180 phr of a filler selected from the group consisting of carbon black and silica.

7. The vulcanizable rubber composition of claim 6, wherein the amount of the resin ranges from 50 to 60 phr.

8. The vulcanizable rubber composition of claim 6, wherein the filler comprises from 130 to 160 phr of silica.

9. The vulcanizable rubber composition of claim 6, wherein the second elastomer is an isoprene-butadiene rubber.

10. The vulcanizable rubber composition of claim 6, wherein the oil is selected from the group consisting of aromatic oils, paraffinic oils, naphthenic oils, MES oils, TDAE oils, heavy naphthenic oils, vegetable oils, sunflower oils, soybean oils, and safflower oils.

11. A pneumatic tire having a component comprising the vulcanizable rubber composition of claim 6.

12. A vulcanizable rubber composition comprising:
(A) 100 parts by weight of elastomer consisting of 70 to 100 parts by weight, per 100 parts by weight of the elastomer (phr), of an isoprene-butadiene rubber having a Tg ranging from −100° C. to −50° C., and 0 to 30 phr of a second elastomer selected from the group consisting of isoprene-butadiene rubber having a Tg ranging from −49 to −20° C., natural rubber, synthetic polyisoprene, and polybutadiene;
(B) from 30 to 80 phr of a resin derived from styrene and alphamethylstyrene and having a Tg of at least 20° C.;
(C) from 1 to 4 phr of an oil; and
(D) from 130 to 160 phr of a filler selected from the group consisting of carbon black and silica.

13. The vulcanizable rubber composition of claim 12, wherein the second elastomer is an isoprene-butadiene rubber.

14. The vulcanizable rubber composition of claim 12, wherein the oil is selected from the group consisting of aromatic oils, paraffinic oils, naphthenic oils, MES oils, TDAE oils, heavy naphthenic oils, vegetable oils, sunflower oils, soybean oils, and safflower oils.

15. A pneumatic tire having a component comprising the vulcanizable rubber composition of claim 12.

* * * * *